Sept. 8, 1964  R. E. MOLTER  3,147,563
FISHING RIG WITH TIP-UP
Filed Sept. 10, 1962  2 Sheets-Sheet 1

Rudolph E. Molter
INVENTOR.

BY
*Attorneys*

Sept. 8, 1964   R. E. MOLTER   3,147,563
FISHING RIG WITH TIP-UP
Filed Sept. 10, 1962   2 Sheets-Sheet 2
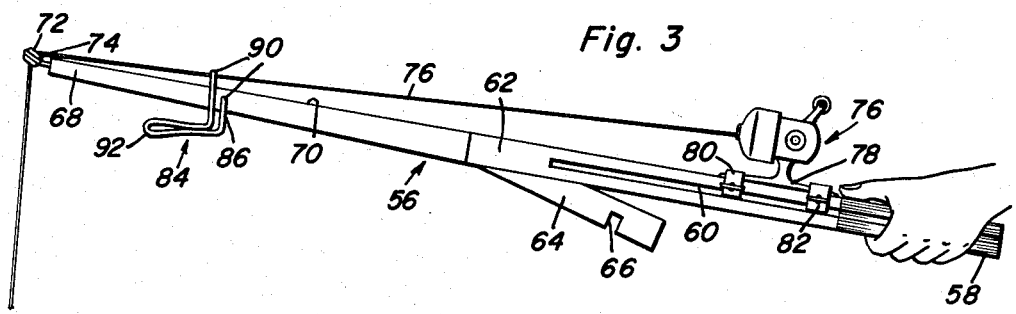
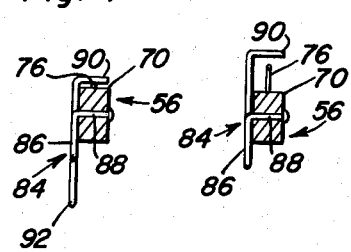
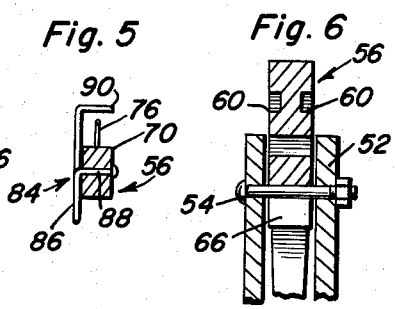
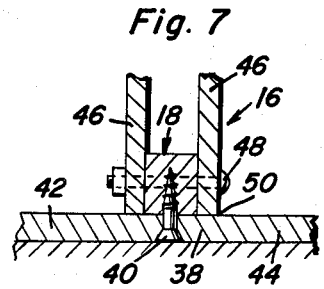
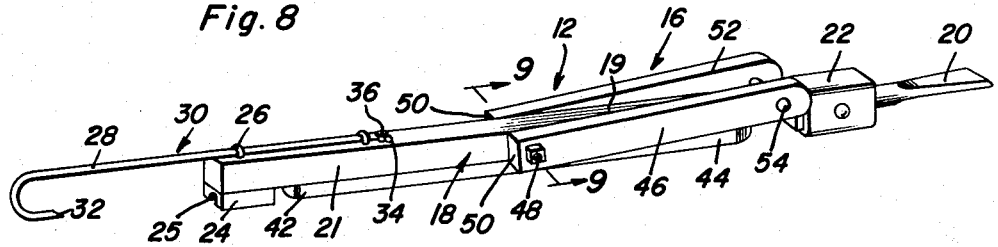
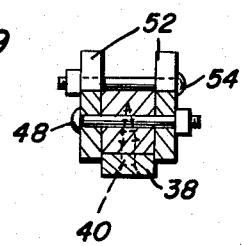
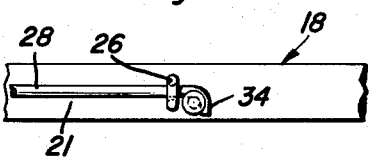
Rudolph E. Molter
INVENTOR.
BY *Attorneys*

United States Patent Office 3,147,563
Patented Sept. 8, 1964

1

3,147,563
FISHING RIG WITH TIP-UP
Rudolph E. Molter, Rte. 1, Box 100, Necedah, Wis.
Filed Sept. 10, 1962, Ser. No. 222,285
4 Claims. (Cl. 43—17)

The present invention relates to a portable knockdown-type fishing rig which is expressly, although not necessarily adapted for ice fishing.

Briefly, the rig is similar to certain prior art rigs in that it is characterized by a portable stand, that is, a stand embodying a base with an upright or standard rising therefrom and wherein the component parts are foldable or collapsible for compactness and convenience. When set up the stand provides a highly satisfactory support for a tiltable arm, said arm being balanced and having the function of a tip-up or, alternatively construed, a tip-down.

More particularly the arm is not only fulcrumed and thus tiltably mounted atop the stand, it is bodily applicable and removable and is such in construction that it serves as a fishing rod and, in a highly desirable manner, enables the fisherman to utilize it as an independent device for playing a hooked fish.

In carrying out a preferred embodiment of the invention a portable self-standing stand is utilized. This stand embodies collapsible base means which is adapted to reside firmly atop a relatively stationary support surface whether it be ice, a wharf, boat or the like. This base means is provided with a complemental upright whose lower end is hinged and foldable so that the base means and standard can be compactly and conveniently arranged. The aforementioned arm or beam is provided with a line-equipped reel. More explicitly the reel is slidingly and detachably mounted on the arm and the arm has the function of a pull-responsive balanced beam. The reel is adjustable and has the function of a manually regulatable weight whereby the arm or beam is capable of delicate tiltable suspension.

To the ends desired the arm is poised midway between its ends atop a hinging pin on the stand. The reel is detachable and adjustable on an end portion of the arm which constitutes a handle and permits the arm to be used as a fishing rod. The forward or outer end portion of the arm is provided with a unique brake which will be more explicitly touched upon as the description proceeds. The construction is such that when the arm or beam is tipped or tilted down it stays down and indicates that a fish has taken the hook and is on the line.

A general objective is to structurally, functionally and in other ways improve upon prior art tip-up-type fishing rigs and, in doing so, to provide an adaptation which is simple, practical, easy-to-handle and use and which will aptly serve the purposes for which it is intended.

Another object is to provide a base which is preferably cruciform in top plan and wherein one of the crossed members is such that it serves to accommodate an ice chisel at one end and a projectible and retractible optionally usable gaff hook at the other end.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a view in perspective showing the arm as a structural entity bodily detached from the stand and being used by the fisherman;

FIGURE 4 is a section on the line 4—4 of FIGURE 1;

FIGURE 5 is a view of a similar type taken on the section line 5—5 of FIGURE 2;

Figure 2:
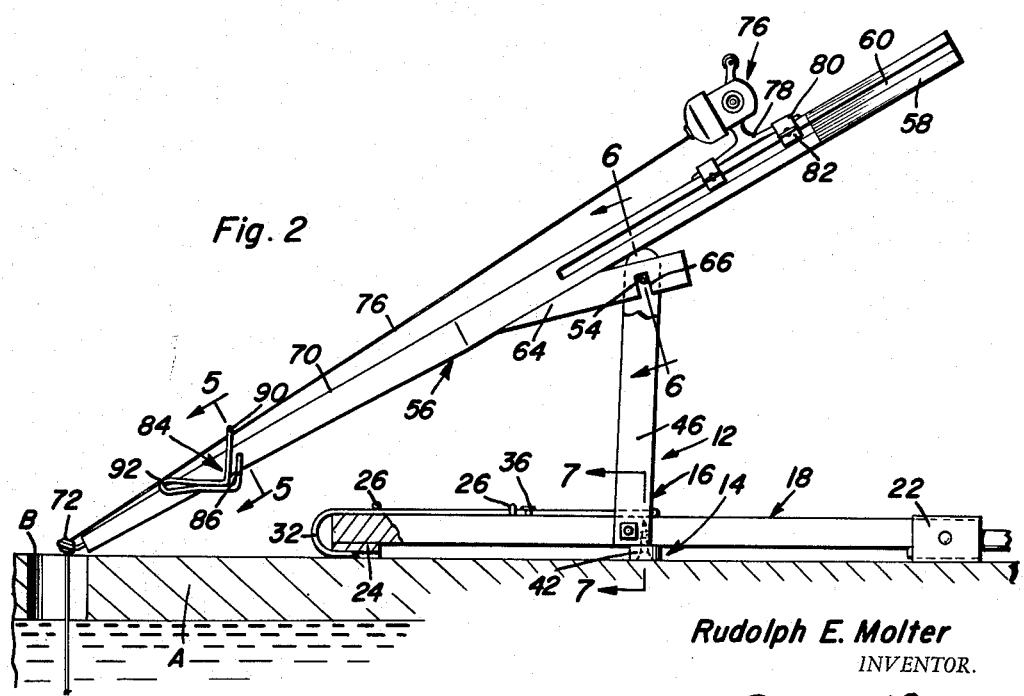
FIGURE 2 is a view in side elevation with portions broken away and which shows the arm in its down-tilted position, this being the position which it assumes when a fish, having taken the line, has exerted a downward tilting pull thereon.

FIGURES 6 and 7 are fragmentary detail sections on a slightly enlarged scale, taken on the plane of the section lines 6—6 and 7—7, respectively, of FIGURE 2;

FIGURE 8 is a view in perspective of the base means and upright means (the stand as an entity) folded in readiness for carrying and where, incidentally, the gaff is projected to a usable position;

FIGURE 9 is a section on the plane of the section line 9—9 of FIGURE 8; and

FIGURE 10 is a fragmentary plan view showing the gaff in a locked position.

Figure 1:
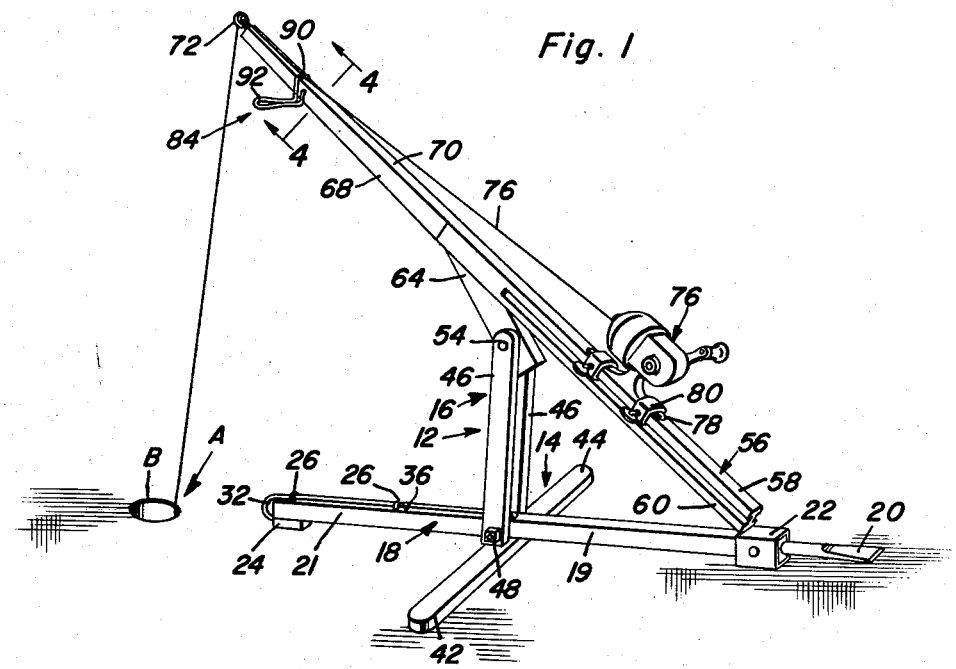
FIGURE 1 is a view in perspective of a tip-up-type fishing rig constructed in accordance with the invention and showing the same set up for use for ice fishing.

Taking up first that part of the overall rig which is broadly referred to as the portable folding or collapsible stand it will be noted that this stand is denoted generally by the numeral 12. The base or base means thereof is denoted at 14 and the upright or standard at 16. The base means comprises an elongated horizontal linearly straight member 18 which is provided at the righthand end with an ice breaking chisel 20 and a reinforcing ferrule or collar 22 (FIGS. 1 and 8). It is provided at the opposite end with a longitudinally grooved block 24. For sake of distinction the chisel-equipped end portion is denoted at 19 while the opposite or lefthand end portion (FIG. 1) is denoted at 21. This end portion is provided with staples 26 in which the shank portion 28 of the gaff hook 30 is mounted. The hook is denoted at 32 and a bent end portion which constitutes a retainer is denoted at 34 and is separably connectible with a headed pin 36 which provides a keeper. When the gaff is retracted the bill of the hook 32 is seated in the groove 25 of the block 24.

The complemental member of the base comprises a somewhat shorter strip member the median portion 38 (FIG. 7) is pivotally and separably connected as at 40 with the corresponding median portion of the base member 18. When this member is not in use it is folded directly beneath and in longitudinal alignment with the member 18 so that the two are compactly arranged, as shown. When the member is in use and at right angles to the member 18 the end portions 42 and 44 project at right angles beyond the member 18 whereby the two parts in crossed relationship provide the aforementioned cruciform base and the ferrule 22 at one end and the block 24 at the other end assist in leveling the two parts in providing a substantial base. The standard is made up of a pair of duplicate uprights or strip members 46 whose lower ends straddle the base member 18 (FIG. 7) and are hingedly bolted, as at 48, thereto. Therefore the lower end portions 50 not only straddle the body 18, they rest atop the pivoted base member and coordinate with the intermediate portion 38 to provide a stable assemblage. With reference now to the upper end portions of the uprights 46, for example, the end portions 52 in FIG. 6 it will be seen that a cross pin or bolt 54 is here provided and said bolt serves as an attaching and fulcruming element for the bodily attachable and detachable tip-up (or tip-down) arm 56. This arm is linearly straight and rigid and one end portion 58 provides a suitable handle as shown in FIG. 3. This end portion is provided on opposite sides with lengthwise grooves 60 which constitute keyways and which open through the righthand end portion 58. The central or median portion 62 is provided with an oblique-angled ancillary or auxiliary arm 64 which has a notch 66 therein which notch rests removably and is fulcrumed on the aforementioned fulcruming bolt 54 (see FIG. 6). The end portion of the arm to the left of the fulcruming bracket 64 is denoted at 68 and preferably tapers in cross-section and has a generally flat upper side 70. The terminal is provided with an eye 72 through which a portion 74 of the fishing line 76 is slidable. The fishing line at the right in FIGS. 1 to 3 is mounted on a spinning reel or an equivalent reel which is denoted generally at 76 and which has a foot-like bracket 78 provided with anchoring clips 80, the latter provided with turned-in end portions which constitute keys 82 and which (not detailed) are shiftable or keyed to slide back and forth as perhaps best brought out in FIG. 1. This reel including its component parts constitutes a counterweight. The arm provides a balancing beam and by utilizing the proper weight components and adjusting the parts as brought out in FIG. 1 the entire righthand end portion of the arm or beam is tilted down with the forward end tilted up thus revealing the normal or set tip-up position of the arm. The arm is sensitively balanced in this manner and when the fish takes the hook and scurries off with the line the pull thus exerted serves to overbalance the balanced arm and consequently the entire lefthand portion tilts or tips down to the position shown in FIG. 1 where it contacts the ice A adjacent to the ice hole B. This signalling position is brought out clearly in FIG. 2. It will be obvious, however, that in order to play the fish it is necessary for the fisherman to grasp the handle portion of the beam or arm and to lift it bodily off of its support means and to utilize it much in the manner of a regular fishing rod as generally illustrated in FIG. 3.

It is desirable to keep the line 76 in alignment with the top surface 70 and to accomplish this a simple counterbalanced brake 84 is provided. The brake here shown is fashioned from a length of wire which is bent upon itself to provide a crank 86 one terminal end portion 88 is shown pivoted or rockably mounted in a bearing provided therefor in the arm (see FIGS. 4 and 5 in particular). The unanchored or free end portion is L-shaped and the tip thereof provides a brake finger 90 which extends transversely across the flat surface 70 and normally resides in contact with the coacting portion of the fishline. In fact the fishline is pinned between the surface 70 and the brake finger 90. The intermediate portion 92 provides a counterbalance and consequently the brake means 84 as an entity is freely swingable and balances itself so that when the rig is set up for a catch as illustrated in FIG. 1 the brake finger 80 presses the coacting portion of the fishline firmly against the surface 70. Alternatively, when the hook has been taken and a normal "tip-up" tilts down and becomes a "tip-down" the brake functions automatically and consequently the line is freed to slide through the guide eye 72.

The balance of the arm is governed by the reel's weight and adjustment can be made for any balance, dependent on the weight of the reel. The reel can be moved to various positions to adjust the balance. This invention permits the attachment of any reel and it is not necessary to use the usual cheap reel that would be supplied by the manufacturer.

The balanced arm tip-up 56 is not hampered by weather or freeze-up which might prevent observation of the fact that a fish is biting.

The balance is such that when it is dipped down, it stays down to indicate that a fish has been biting. The line is loose at all times so that it will feed out and allows the fish to run and it can be seen that the reel is feeding. When it is anticipated that a fish has taken the bait, the user can lift off the balance arm and can use the balance arm and reel as a rod and reel to retrieve the fish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable knockdown fishing rig comprising, in combination, a self-standing stand embodying collapsible base means adapted to reside when in use atop a relatively stationary support surface, said base means being cruciform in plan and embodying a pair of complemental base members having cooperating centralized portions crossing each other and pivotally and separably connected, complemental upright means comprising a pair of spaced parallel upright members having corresponding lower ends thereof straddling and pivotally joined to the uppermost one of the aforementioned base members, a bodily applicable and removable elongated rigid arm having forward and rearward end portions, said forward end portion provided with a fishing line guide eye, the median portion of said rigid arm being provided on an underneath side with an oblique angled auxiliary arm, said auxiliary arm being rigid and being detachably and hingedly mounted atop the upper ends of said members, a fishing line reel, and means carried by said reel and also by an inward end portion of said rigid arm at a point inwardly of the aforementioned upright slidingly and detachably mounting the reel, said rigid arm having the function of a pull-responsive balanced beam, said reel being adjustable along said rigid arm and having the function of a manually regulatable counterweight, said rigid arm when detached from said upright means having the function of a fishing rod.

2. An ice fishing rig comprising, in combination, a portable knockdown self-standing stand embodying base means, said base means provided at an axial central portion thereof with a fold-down upright, said upright being provided at its upper end with a readily accessible fulcruming pin, an elongated rigid arm having handle means at an inward end and provided on its outward end with a line guide eye, said handle means being provided on diametrically opposite sides with lengthwise grooves, said grooves opening through an end portion of said arm and constituting keyways, a pair of complemental clips slidably and removably connected with the arm by way of said grooves, a line-equipped reel having bracket means slidingly mounted atop the arm and held in position on the arm after having been adjusted to any required set position along the length of the arm, the intermediate portion of said arm being provided on an underneath side thereof with an auxiliary rigid oblique-angled arm having a notched terminal portion detachably and hingedly mounted on the aforementioned fulcruming pin.

3. The structure defined in claim 2 and an automatically trippable brake device pivotally mounted on an outer end portion of said rigid arm, said device comprising a pivoted crank, a brake finger, and an intervening portion constituting a counterweight and serving to automatically apply and remove said brake finger.

4. The structure defined in claim 2 and in combination, an automatically trippable brake device comprising a length of wire bent upon itself to provide a crank, a terminal portion of said crank being pivoted and rockably mounted in a bearing provided therefor on a side of said rigid arm inwardly of the aforementioned line guide eye, said wire having an unanchored free end portion, said free end portion being L-shaped and the tip thereof constituting a brake finger and said brake finger extending transversely across the cooperating top surface of the rigid arm and cooperating with said line guide eye so that the line may be passed under said finger and then through said line guide eye.

References Cited in the file of this patent

UNITED STATES PATENTS

| | | | |
|---|---|---|---|
| 2,663,962 | King | Dec. 29, | 1953 |
| 2,719,691 | Vance | Oct. 4, | 1955 |
| 2,732,649 | Tuttle | Jan. 31, | 1956 |
| 2,773,326 | Calvert | Dec. 11, | 1956 |
| 2,787,857 | Schlegelmilch | Apr. 9, | 1957 |
| 2,921,763 | Miller et al. | Jan. 19, | 1960 |
| 3,057,106 | Wheeler | Oct. 9, | 1962 |